United States Patent
Nashi (10) Patent No.: US 8,040,778 B2
(45) Date of Patent: Oct. 18, 2011

(54) DIFFRACTION ELEMENT AND OPTICAL HEAD DEVICE EQUIPPED THEREWITH

(75) Inventor: Hirotaka Nashi, Koriyama (JP)

(73) Assignee: Asahi Glass Company, Limited, Tokyo (JP)

(*) Notice: Subject to any disclaimer, the term of this patent is extended or adjusted under 35 U.S.C. 154(b) by 198 days.

(21) Appl. No.: 12/422,051

(22) Filed: Apr. 10, 2009

(65) Prior Publication Data
US 2009/0190458 A1  Jul. 30, 2009

Related U.S. Application Data

(63) Continuation of application No. PCT/JP2007/069712, filed on Oct. 9, 2007.

(30) Foreign Application Priority Data

Oct. 10, 2006 (JP) ................................. 2006-276500

(51) Int. Cl.
*G11B 7/00* (2006.01)
(52) U.S. Cl. ................................. 369/112.03
(58) Field of Classification Search .............. 369/112.03
See application file for complete search history.

(56) References Cited

U.S. PATENT DOCUMENTS

| | | | |
|---|---|---|---|
| 6,545,808 B1 | 4/2003 | Ehbets et al. | |
| 6,891,147 B2* | 5/2005 | Goto et al. | 250/216 |
| 7,142,363 B2 | 11/2006 | Sato et al. | |
| 7,379,241 B2* | 5/2008 | Smith | 359/485.04 |
| 7,755,834 B2* | 7/2010 | Koyanagi et al. | 359/566 |
| 2005/0249447 A1 | 11/2005 | Momoki et al. | |
| 2006/0033913 A1 | 2/2006 | Sato et al. | |
| 2006/0057707 A1 | 3/2006 | Cunningham et al. | |
| 2006/0152809 A1 | 7/2006 | Smith | |
| 2008/0030632 A1 | 2/2008 | Murata | |
| 2008/0316600 A1 | 12/2008 | Koyanagi et al. | |

FOREIGN PATENT DOCUMENTS

| | | |
|---|---|---|
| EP | 1 596 226 | 11/2005 |
| EP | 1 783 520 | 5/2007 |
| JP | 11044810 (A) | 2/1999 |
| JP | 11295524 (A) | 10/1999 |
| JP | 2004-341471 | * 12/2004 |
| JP | 2004342295 (A) | 12/2004 |
| JP | 2006073042 (A) | 3/2006 |

OTHER PUBLICATIONS

MAT (machine assisted translation) of JP 2004-341471.*

* cited by examiner

*Primary Examiner* — Aristotelis Psitos
(74) *Attorney, Agent, or Firm* — Oblon, Spivak, McClelland, Maier & Neustadt, L.L.P.

(57) ABSTRACT

A grating portion has a plurality of convex portions provided on at least one principal plane of a transparent substrate having a first layer containing a first transparent material and a second layer containing a second transparent material, and extended in parallel to each other in a first direction as well as periodically arranged in a second direction orthogonal to the first direction. A filling portion fills a third layer containing a third transparent material at least between the plurality of convex portions. Assuming that the change rate of the refractive index with the change of temperature of the first transparent material is $\alpha_A$, the change rate of the refractive index with the change of temperature of the second transparent material is $\alpha_B$, and the change rate of the refractive index with the change of temperature of the third transparent material is $\alpha_C$, the relationship $\alpha_A < \alpha_C < 0$ and $|\alpha_C| > |\alpha_B|$ is satisfied.

15 Claims, 6 Drawing Sheets

FIG. 5

DIFFRACTION ELEMENT AND OPTICAL HEAD DEVICE EQUIPPED THEREWITH

TECHNICAL FIELD

The present invention relates to a diffractive element for diffracting the light, and an optical head device having the diffractive element which records or reproduces information on or from an optical recording medium (hereinafter referred to as an "optical disk") such as CD or DVD.

BACKGROUND ART

Conventionally, there is a diffractive element for use in an optical head device of this kind which divides an emitted light from a laser light source into three beams including a principal beam and two sub-beams, in which the sub-beams are used for tracking control. In this usage, the diffractive element is usually one in which a material such as plastic or glass is processed into a periodic concave and convex shape, in which the depth of concave and convex is about several hundreds nm. Herein, for example, in the diffractive element which contains air in the concave portion of the concave and convex shape and glass in the convex portion, the temperature dependency of the diffraction efficiency is so small as to cause no problem in practice.

On the other hand, with a technology for integrally forming the semiconductor lasers having a plurality of oscillation wavelengths in recent years, a so-called twin LD in which the semiconductor lasers having two wavelengths of 660 nm band (for DVD) and 785 nm band (for CD) are composed as one package has been manufactured commercially. In the optical head device using the twin LD, it is expected that the number of parts in the device is reduced by sharing a part of the optical path for the laser beam of each wavelength. Supposing that the device is used in the shared optical path, a diffractive element with a wavelength selection function of the diffraction efficiency added has been proposed (e.g., refer to JP-A-2004-342295).

According to the above publication, for example, in a DVD wavelength selection diffractive element for the twin LD, the convex portion in the periodic concave and convex shape is formed of an optical multilayer for controlling the transmission phase in two wavelengths, and the concave portion is filled with a transparent material to obtain the wavelength selectivity for the diffraction efficiency. In this diffractive element, the depth of the concave and convex, or the depth of grating, is about 5 μm.

However, in the diffractive element as shown in the above publication, with a structure in which the convex portion forming the grating is formed of the optical multilayer made of inorganic material, and the concave portion is formed of an organic material, the change rate of the refractive index with the change of temperature is greatly different between the convex portion and the concave portion, whereby there is a problem that the diffraction efficiency is likely to change depending on the temperature of the system.

DISCLOSURE OF THE INVENTION

Hence, an object of the invention is to provide a diffractive element and an optical head device having the diffractive element in which the temperature dependency of diffraction efficiency can be lower than conventionally.

In this specification, the concave portion means a part that becomes concave in a manufacturing process for the diffraction element. This concave portion is filled with organic or inorganic material to become flat in the final form, whereby there is no distinction between the concave portion and the convex portion in the shape. In the following explanation, the concave portion and the convex portion in the manufacturing process for the diffractive element are used.

In order to accomplish the above object, the present invention provides a diffractive element comprising a transparent substrate, a grating portion having a plurality of convex portions provided on at least one principal plane of the transparent substrate having a first layer containing a first transparent material and a second layer containing a second transparent material, and extended in parallel to each other in a first direction as well as periodically arranged in a second direction orthogonal to the first direction, and a filling portion for filling a third layer containing a third transparent material at least between the plurality of convex portions, wherein assuming that a change rate of the refractive index with the change of temperature of the first transparent material is $\alpha_A$, a change rate of the refractive index with the change of temperature of the second transparent material is $\alpha_B$, and a change rate of the refractive index with the change of temperature of the third transparent material is $\alpha_C$, a relationship $\alpha_A < \alpha_C < 0$ and $|\alpha_C| > |\alpha_B|$ is satisfied.

With this constitution, the diffraction efficiency for the temperature change can be kept constant, using differences in the change rate of the refractive index with the change of temperature between the first to third transparent materials, whereby the temperature dependency of diffraction efficiency can be lower than conventionally.

The second layer can be an optical multilayer.

With this constitution, the light of a predetermined wavelength can be diffracted, using the wavelength selectivity of the diffraction efficiency that the optical multiplayer has, whereby the temperature dependency of diffraction efficiency can be lower than conventionally.

The thickness of the first layer is selected so that the change amount of transmission phase difference with the change of temperature in the grating portion and the change amount of transmission phase difference with the change of temperature in the filling portion may be equal.

With this constitution, the temperature dependency of diffraction efficiency can be lower than conventionally.

The invention provides an optical head device comprising a light source for emitting the lights having mutually different two wavelengths, an objective lens for converging light emitted from the light source onto an optical recording medium, a photo-detector for detecting light reflected by the optical recording medium, and the diffractive element as described above which is arranged on an optical path between the light source and the objective lens.

With this constitution, since the diffractive element keeps the diffraction efficiency for the temperature change almost constant, it is possible to make the stable tracking control even if a temperature change occurs.

BEST MODE FOR IMPLEMENTING THE INVENTION

The embodiments of the present invention will be described below in detail with reference to the accompanying drawings. A description will be given of an example in which a diffractive element according to the invention is applied to an element that diffracts light in making recording or reproduction for CD or DVD.

Figure 1:
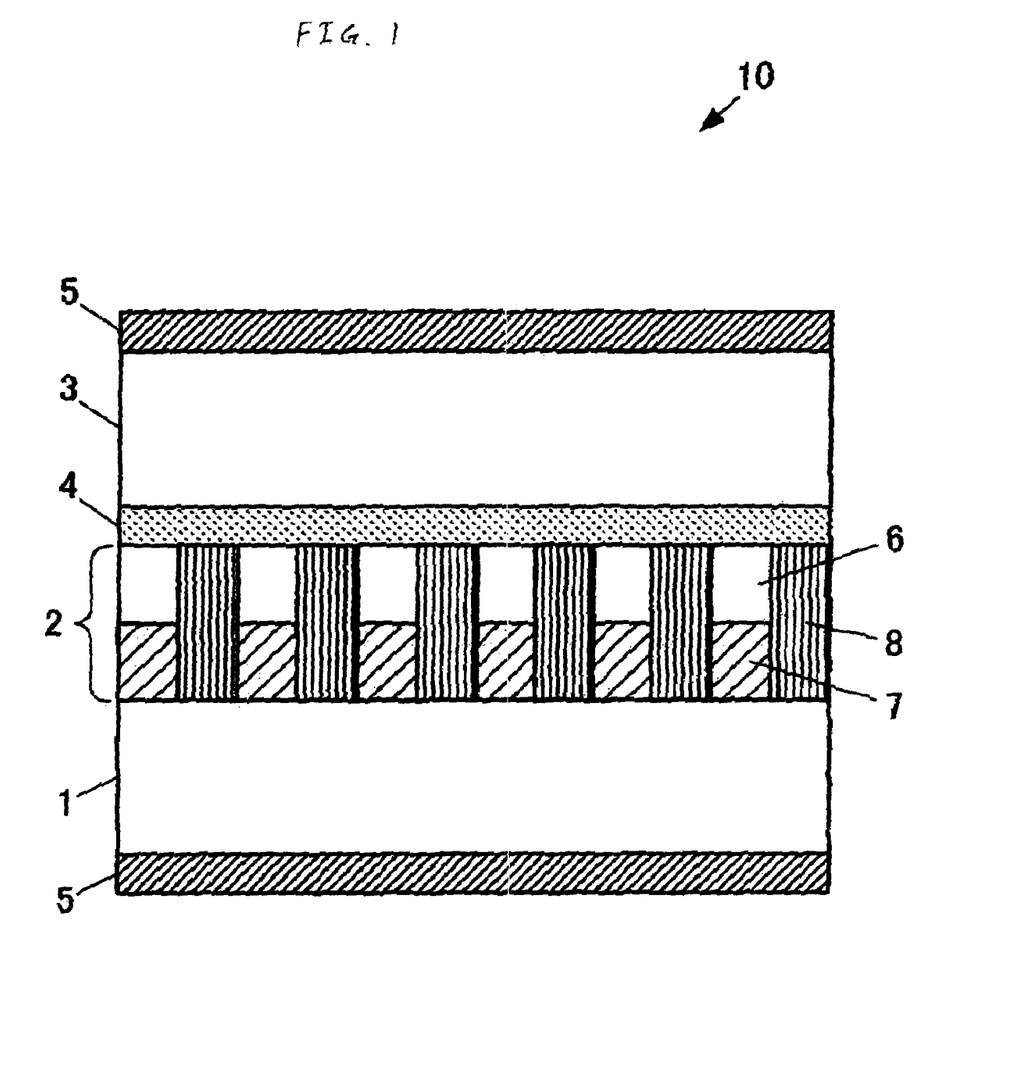
FIG. 1 is a cross-sectional view showing the conceptual constitution of a diffractive element according to an embodiment of the present invention.

Referring to FIG. 1, the constitution of the diffractive element in this embodiment will be firstly described below.

The diffractive element 10 in this embodiment includes a transparent substrate 1 having transparency, a diffraction grating 2 for diffracting light, a cover glass board 3 opposed to the diffraction grating 2, an adhesive layer 4 for bonding the diffraction grating 2 and the cover glass board 3, and anti-reflection coatings 5 provided on the transparent substrate 1 and the cover glass board 3. In the following description, a direction from the transparent substrate 1 to the cover glass board 3 is defined as an upper direction, and its reverse direction is defined as a lower direction, in which a plane of each component at an upper side is called "upper surface", and a plane at a lower side is called "lower surface".

The transparent substrate 1 is made of a transparent material such as glass, quartz glass or plastic, for example. It is preferable that the surface of the transparent substrate 1 is flattened, because the transmission wave-front aberration can be made smaller.

The cover glass board 3 is made of a transparent material such as glass or plastic, for example, and opposed to the upper surface of the diffraction grating 2 with a certain spacing. It is preferable that the surface of the cover glass board 3 is flattened, because the transmission wave-front aberration can be made smaller.

It is preferable that the materials of the transparent substrate 1 and the cover glass board 3 are selected so that the refractive index of the transparent substrate 1 and the refractive index of the cover glass board 3 substantially coincide with each other.

Also, one or both of the corer glass board 3 and the transparent substrate 1 may be shared with other optical elements. The other optical elements may include a wave plate, a different diffraction grating other than the invention, a polarizing diffraction grating, and an optical element using liquid crystal. The diffraction grating with this constitution is integrally laminated with other optical elements, thereby reducing the number of optical parts to simplify the constitution. Therefore, this diffraction grating is preferable when the diffraction grating is applied to the optical head device because the adjustment of the optical system is facilitated.

The adhesive layer 4 is disposed in a space between the upper surface of the diffraction grating 2 and the lower surface of the cover glass board 3. It is preferable that the adhesive layer 4 is made of a material with a refractive index near to the refractive index of the cover glass board 3, because the interface reflection loss can be reduced. The material of the adhesive layer 4 may be a first transparent material making up a first layer 6 of the diffraction grating 2 which will be described later. Also, the diffraction grating 2 and the cover glass board 3 may be directly bonded without forming the adhesive layer 4, or the cover glass board 3 may be shared with the other element boards.

The anti-reflection coating 5 is formed by vapor deposition, for example, on the lower surface of the transparent substrate 1 and the upper surface of the cover glass board 3. It is preferable that the anti-reflection coating 5 is provided, because it is possible to suppress a loss due to interfacial reflection of light for use in making the recording or reproduction of CD or DVD and increase the intensity of diffracted light to the incident light. The anti-reflection coating 5 may not be formed.

The diffraction grating 2 includes the first layer 6 made of a first transparent material, a second layer 7 formed of an optical multilayer, and a third layer 8 made of a third transparent material. The second layer 7 is formed of a plurality of layers made on the upper surface of the transparent substrate 1, and further the first layer 6 is formed in parallel on the upper surface of the top layer of the second layer 7, whereby the first layer 6 and the second layer 7 form a convex portion (grating portion) of the diffraction grating 2 as a whole. On the other hand, a concave portion of the diffraction grating 2 is made of the third transparent material to be as high as the convex portion (filling portion). That is, thickness of the third layer 8 is the sum of the thickness of the first layer 6 and the thickness of the second layer 7.

In the following, it is assumed that the refractive indexes of the first transparent material and the third transparent material at the use wavelength $\lambda_1$ are $n_A$ and $n_C$, and the refractive index of the second layer 7 is $n_B$ as a whole. Also, it is assumed that the change rates of the refractive index with the change of temperature of the first, second and third transparent materials are $\alpha_A$, $\alpha_B$ and $\alpha_C$ (/° C.), and the thicknesses of the first layer 6, the second layer 7 and the third layer 8 are $d_A$, $d_B$ and $d_C$.

Herein, assuming that the transmission phase for the light having wavelength $\lambda_1$ vertically incident on the second layer 7 to be transmitted and emitted is $\phi_1$ (radian), the refractive index $n_B$ of the second layer 7 as a whole can be considered as $(\phi_1 \cdot \lambda_1)/(2\pi \cdot d_B)$.

For the first layer 6 and the third layer 8 filled and formed in the concave portion, the first transparent material and the third transparent material are selected so that the refractive indexes of both may be substantially matched at the ordinary temperature (25 to 30° C.). In this embodiment, $n_A = n_C = 1.534$.

The first transparent material and the third transparent material are solid or liquid, inorganic or organic, and may be acrylic resin, epoxy resin, or fluorine-contained aromatic polymer material, for example. If the first transparent material and the third transparent material are selected so that the relationship $\alpha_A < \alpha_C < 0$ and $|\alpha_C| > |\alpha_B|$ is satisfied among $\alpha_A$, $\alpha_B$ and $\alpha_C$, a change in the diffraction efficiency with respect to the temperature change can be suppressed to be smaller. In this embodiment, the first transparent material is acrylic polymer and the third transparent material is fluorine-contained aromatic polymer, but the invention is not limited thereto. A method for forming the first transparent material and the third transparent material is a film forming method for performing a curing process after spin coating in the case of liquid, for example. Also, the upper part of the second layer 7 between each third layer 8 may be filled with polymerized acrylic resin as the first transparent material, with the upper surface of the third layer 8 covered and polymerized, and the adhesive layer 4 may be made of the first transparent material to bond the diffraction grating 2 and the cover glass board 3.

The material of the second layer 7 may be an inorganic material such as $SiO_2$, $SiON$, $ZrO_2$, $Ta_2O_5$, $Nb_2O_5$, $TiO_2$ or $Al_2O_3$. A method for forming the second layer 7 may be a vacuum evaporation method or sputtering method.

Table 1 shows a design example of the specific organization of the second layer 7. In the table, the "layer" denotes the sequence of lamination from the upper surface of the transparent substrate 1, in which the layer nearest to the upper surface of the transparent substrate 1 is the first layer. This design example is an optical multilayer made up of 41 layers using an $SiO_2$ thin film (refractive index 1.469) for the low refractive index material and a $Ta_2O_5$ thin film (refractive index 2.172) for the high refractive index material, with a total thickness of 4978 nm. The refractive index $n_B$ of this optical multilayer to the light having wavelength $\phi_1$ is 1.518 as obtained from modulation of the transmission phase of this transmitted light.

TABLE 1

| Layer | Material | Film thickness (nm) |
|---|---|---|
| 41 | $SiO_2$ | 223 |
| 40 | $Ta_2O_5$ | 27 |
| 39 | $SiO_2$ | 242 |
| 38 | $Ta_2O_5$ | 8 |
| 37 | $SiO_2$ | 246 |
| 36 | $Ta_2O_5$ | 4 |
| 35 | $SiO_2$ | 238 |
| 34 | $Ta_2O_5$ | 5 |
| 33 | $SiO_2$ | 226 |
| 32 | $Ta_2O_5$ | 12 |
| 31 | $SiO_2$ | 215 |
| 30 | $Ta_2O_5$ | 14 |
| 29 | $SiO_2$ | 209 |
| 28 | $Ta_2O_5$ | 11 |
| 27 | $SiO_2$ | 208 |
| 26 | $Ta_2O_5$ | 14 |
| 25 | $SiO_2$ | 215 |
| 24 | $Ta_2O_5$ | 27 |
| 23 | $SiO_2$ | 236 |
| 22 | $Ta_2O_5$ | 86 |
| 21 | $SiO_2$ | 118 |
| 20 | $Ta_2O_5$ | 4 |
| 19 | $SiO_2$ | 211 |
| 18 | $Ta_2O_5$ | 11 |
| 17 | $SiO_2$ | 228 |
| 16 | $Ta_2O_5$ | 17 |
| 15 | $SiO_2$ | 240 |
| 14 | $Ta_2O_5$ | 24 |
| 13 | $SiO_2$ | 239 |
| 12 | $Ta_2O_5$ | 25 |
| 11 | $SiO_2$ | 232 |
| 10 | $Ta_2O_5$ | 10 |
| 9 | $SiO_2$ | 227 |
| 8 | $Ta_2O_5$ | 4 |
| 7 | $SiO_2$ | 224 |
| 6 | $Ta_2O_5$ | 4 |
| 5 | $SiO_2$ | 224 |
| 4 | $Ta_2O_5$ | 4 |
| 3 | $SiO_2$ | 226 |
| 2 | $Ta_2O_5$ | 19 |
| 1 | $SiO_2$ | 222 |
| Substrate | Glass | |

If the light having wavelength $\lambda_1$ (660 nm) is incident, there occurs a transmission phase difference due to a difference in the refractive index between convex portion and concave portion of the diffraction grating 2, whereby the diffraction grating 2 functions as the diffraction grating in which the first-order diffraction efficiency is about 5.4%, the zero-order diffraction efficiency (transmittance of the transmitted light) is about 86.4%, and the diffraction efficiency ratio (zero-order/first-order) is about 16. On the other hand, the first-order diffraction efficiency for the light having wavelength $\lambda_2$ (785 nm) is as small as about 0.4%, whereby the diffraction grating 2 functions as the diffraction grating of transmitting almost all the light having wavelength $\lambda_2$.

The diffraction efficiency when the temperature of the system rises will be described below. For the first layer 6 and the third layer 8, the refractive index at the ordinary temperature is about 1.534, but the change rate of the refractive index with the change of temperature when the temperature rises from the ordinary temperature to 80° C. is different. For acrylic polymer and fluorine-contained aromatic polymer used in this embodiment, the temperature change factors of the refractive index are $-4 \times 10^{-4}$ (/° C.) and $-1 \times 10^{-4}$ (/° C.). Also, the absolute value of the change rate of the refractive index with the change of temperature for the second layer 7 is sufficiently smaller than the first layer 6 and the third layer 8, and dealt with as almost zero here.

To keep the diffraction efficiency of the light having wavelength $\lambda_1$ almost constant when the temperature of the system rises in the above temperature range, it is necessary that the change amount of transmission phase difference with the change of temperature in the convex portion of the diffraction grating 2 composed of the first layer 6 and the second layer 7 and the change amount of transmission phase difference with the change of temperature in the concave portion of the diffraction grating 2 composed of the third layer 8 are equivalent. Accordingly, $d_A$ is set such that $\alpha_A \times d_A + \alpha_B \times d_B = \alpha_C \times (d_A + d_B)$. In this embodiment, $d_A = 1.7$ μm. With this configuration, the diffractive element 10 of this embodiment can keep the diffraction efficiency almost constant for the light having wavelength $\lambda_1$ in the range from the ordinary temperature to 80° C. The term "equivalent" as mentioned previously means that the temperature change amounts of transmission phase difference in the convex portion and the concave portion are not exactly equal, but almost equal in use.

Also, in consideration of a temperature rise in the actual optical head device, the temperature change of the diffraction efficiency can be further reduced in the following way. That is, the oscillation wavelength of a semiconductor laser used as the light source of the optical head device has the characteristic shifting to the long wavelength side along with the temperature rise of the system. If the laser oscillation wavelength with the temperature rise of the system shifts at a rate of 0.2 nm/° C., the laser oscillation wavelength of the laser with the wavelength 660 nm at the ordinary temperature shifts to about 670 nm at 80° C.

On the other hand, the diffraction grating with the above constitution has the wavelength dependency of the diffraction efficiency, whereby the diffraction efficiency ratio that is the intensity ratio of the zero-order diffracted light to the first-order diffracted light decreases as the wavelength is longer than the wavelength $\lambda_1$. Therefore, even though the diffraction efficiency of the diffraction grating for the light having wavelength $\lambda_1$ is kept constant against the temperature change, the diffraction efficiency ratio decreases if the wavelength of incident light shifts.

Thus, for $d_A$ satisfying $\alpha_A \times C_A + \alpha_B \times d_B = \alpha_C \times (d_A + d_B)$, it is further finely adjusted so that the equivalent diffraction efficiency ratio may be obtained for the shifted laser oscillation wavelength when the temperature change in the optical head device. That is, for this purpose, it is preferably about 60% to about 90% of the value of $d_A$ satisfying the above expression at the ordinary temperature, as will be described later. As a result, it is favorable that the diffraction efficiency ratio for the light emitted from the light source can be kept constant, irrespective of the temperature of the system. Instead of the fine adjustment of $d_A$, fine adjustment of $\alpha_A$ may be made. Also, at least one of $d_A$ and $\alpha_A$ may be finely adjusted.

Referring now to FIG. 1, a specific manufacturing method for the diffractive element 10 according to the invention will be described below in detail. The materials and manufacturing method as described in the following are only illustrative, and the invention is not limited thereto.

In the diffraction grating 10 of this embodiment, an optical multilayer as shown in the table 1 is formed on the transparent substrate 1 by reactive sputtering. Thereafter, the convex portions composed of the optical multilayer, which are formed periodically and in parallel to each other and extending in one direction, are provided using the techniques of photolithography and dry etching. The period of a concave and convex structure produced consequently is equivalent to a grating pitch of the diffraction grating 2, and is 20 μm in this embodiment, with a duty of 0.5. Also, the dry etching is stopped at the stage where the surface of the transparent substrate 1 is exposed, whereby the concave and convex shape is substantially constituted by only the optical multilayer. The second layer 7 is formed through this process.

Next, a fluorine-contained aromatic polymer material of the third transparent material is coated on the upper surface of the second layer 7 by spin coating, and baked to fill the concave portions. At this time, the concave portions are not only filled but also the upper surface of the convex portions is further covered in a thickness of 3 μm to be flat as a whole.

Subsequently, the surface of the third transparent material covering the entire upper surface of the second layer 7 is worked by the techniques of photolithography and dry etching to remove the third transparent material on the second layer 7. After the concave portion where the third transparent material is removed is filled and the first transparent material is coated to cover the third transparent material, the cover glass board 3 is laminated, solidified and bonded. The first layer 6 and the third layer 8 are formed through this process.

And an anti-reflection coating 5 at the use wavelength is formed on the lower surface of the transparent substrate 1 and the upper surface of the cover glass board 3, whereby the diffractive element 10 is obtained.

Figure 2A:
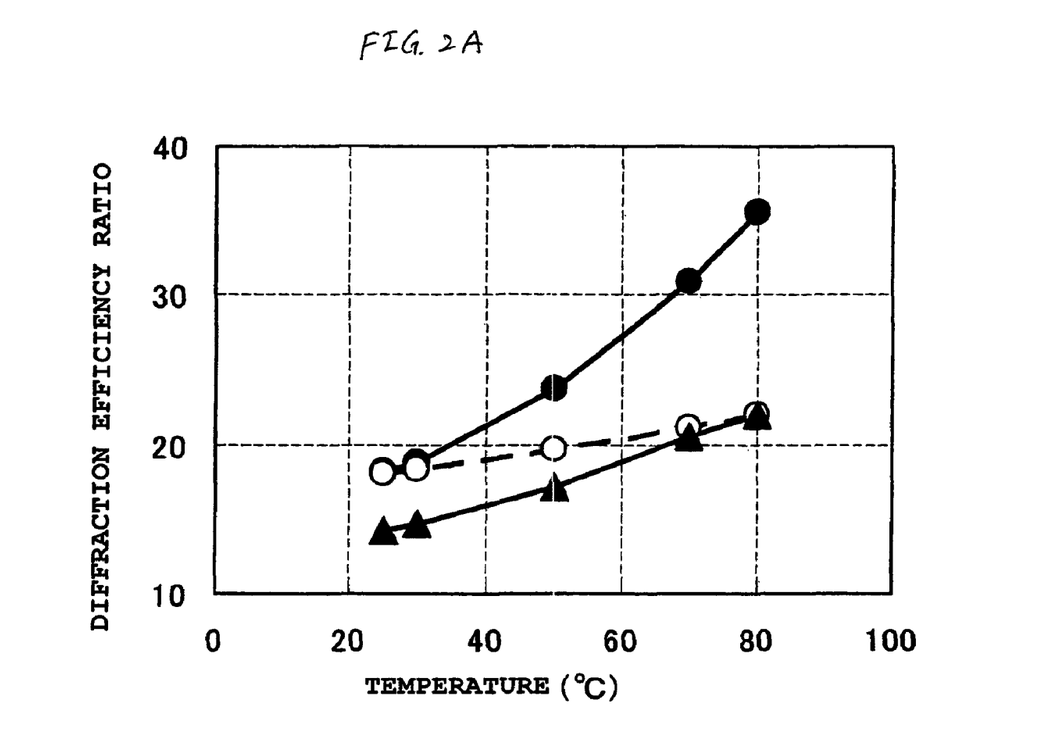
FIG. 2A is a graph showing the temperature characteristic of a diffraction efficiency ratio in the diffractive element in a comparative example.
Figure 2B:
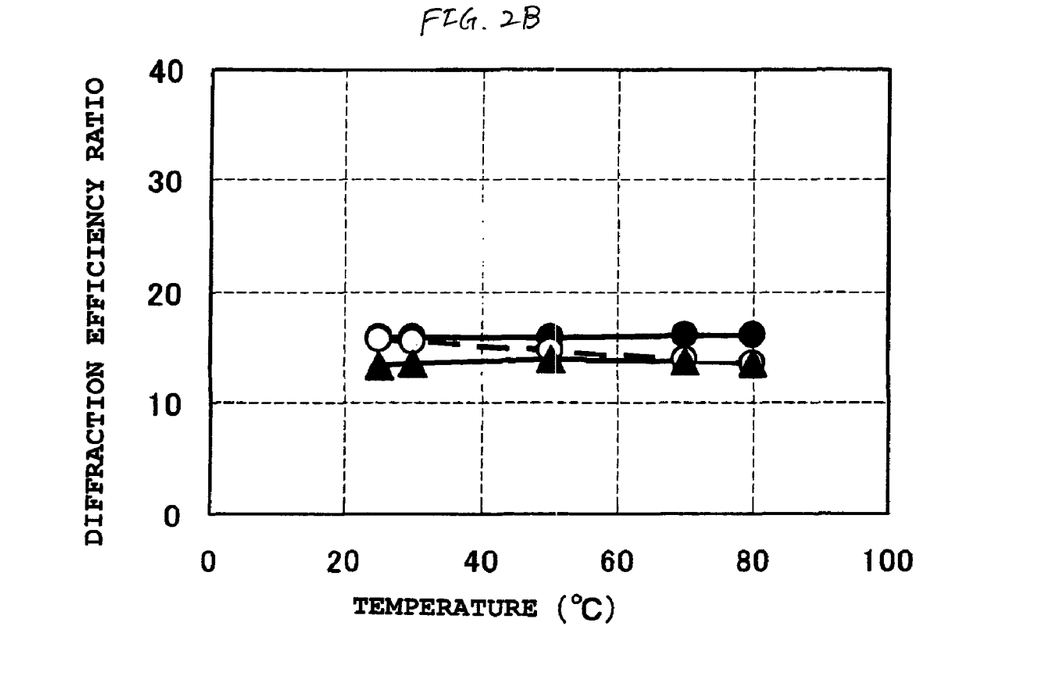
FIG. 2B is a graph showing the temperature characteristic of the diffraction efficiency ratio in the diffractive element of FIG. 1.
Figure 2C:
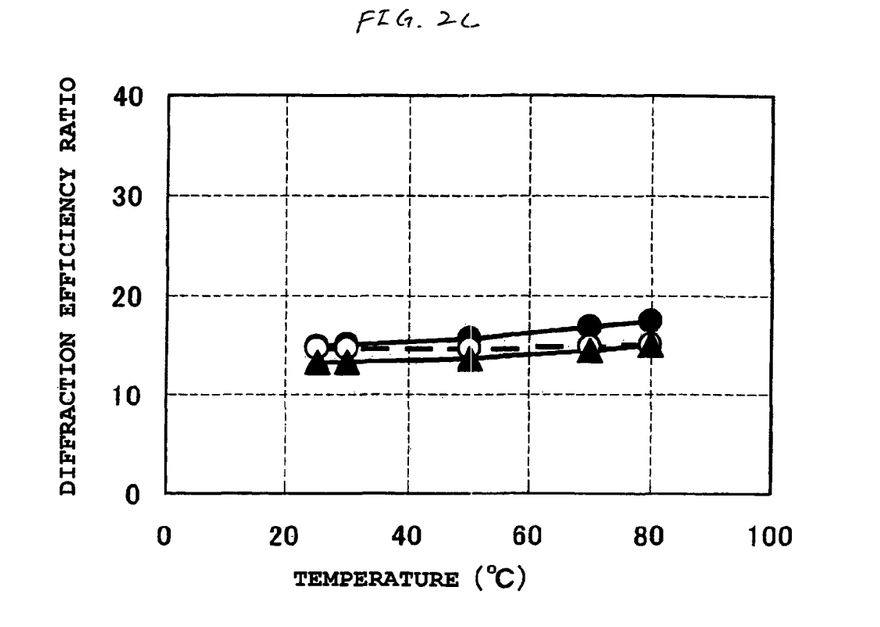
FIG. 2C is a graph showing the temperature characteristic of the diffraction efficiency ratio in the diffractive element of FIG. 1, in which the thickness of a first layer is changed.

Referring to FIGS. 2A to 2C, the temperature characteristics of the diffraction efficiency ratio of the diffractive element 10 according to this embodiment will be described below.

In these figures, the black dot sign indicates the temperature characteristic of the diffraction efficiency ratio for the light having a wavelength of 660 nm in the diffraction grating of each example, the black triangular sign indicates the temperature characteristic of the diffraction efficiency ratio for the light having a wavelength of 670 nm in each diffraction grating, and the white dot sign indicates the temperature characteristic of the diffraction efficiency ratio in the diffraction grating of each example when the wavelength of light at each temperature is shifted to the 0.2 nm/° C. longer wavelength side depending on a temperature difference from 25° C.

The temperature characteristic as shown in FIG. 2A is a comparative example for explaining the temperature characteristic of the diffraction efficiency ratio in the diffractive element of the invention, in which the first layer is not formed. In this example, when the temperature rises from the ordinary temperature to 80° C., the diffraction efficiency ratio increases 100% from 18 to 36 if the wavelength of light is constant at 660 nm, and increases 22% from 18 to 22 if the wavelength of light shifts from 660 nm to 670 nm along with temperature rise, causing a great change in the diffraction efficiency ratio.

The temperature characteristic as shown in FIG. 2B is for the diffractive element 10 of the invention. If the wavelength of light is constant at 660 nm, the diffraction efficiency ratio increases from 15.9 to 16.0 with a change width of 1% or less, or substantially no change, and if the wavelength of light shifts from 660 nm to 670 nm, the diffraction efficiency ratio decreases from 15.9 to 13.5, or only 15%.

The temperature characteristic as shown in FIG. 2C is for the diffractive element 10 of the invention, in which the thickness of the first layer is adjusted in consideration of the temperature rise of the system, as will be described later. If the wavelength of light is constant at 660 nm, the diffraction efficiency ratio changes +17% from 14.9 to 17.5, in which the change width is larger than in the example of FIG. 2B, but suppressed to 20% or less. On the other hand, if the wavelength of light shifts from 660 nm to 670 nm along with the temperature rise, the change width is 1% or less, or substantially does not change.

With the diffractive element 10 of the invention as shown in FIG. 2B, the diffraction grating 2 comprises the first layer 6 made of the first transparent material, the second layer 7 composed of the optical multilayer, and the third layer 8 made of the third transparent material, in which assuming that the change rates of the refractive index with the change of temperature of the first, second and third transparent materials are $\alpha_A$, $\alpha_B$ and $\alpha_C$, the relationship $\alpha_A < \alpha_C < 0$ and $|\alpha_C| > |\alpha_B|$ is satisfied, whereby the diffraction efficiency with respect to the temperature change can be kept almost constant, using a difference in the change rate of the refractive index with the change of temperature between the first, second and third transparent materials, so that the temperature dependency of the diffraction efficiency can be lower than conventionally.

Also, the temperature characteristic of the diffraction efficiency can be easily corrected by adjusting the thickness $d_A$ of the first layer 6 as shown in FIG. 2C, whereby the diffraction efficiency ratio can be kept constant even if the wavelength shifts with the temperature.

Figure 3A:
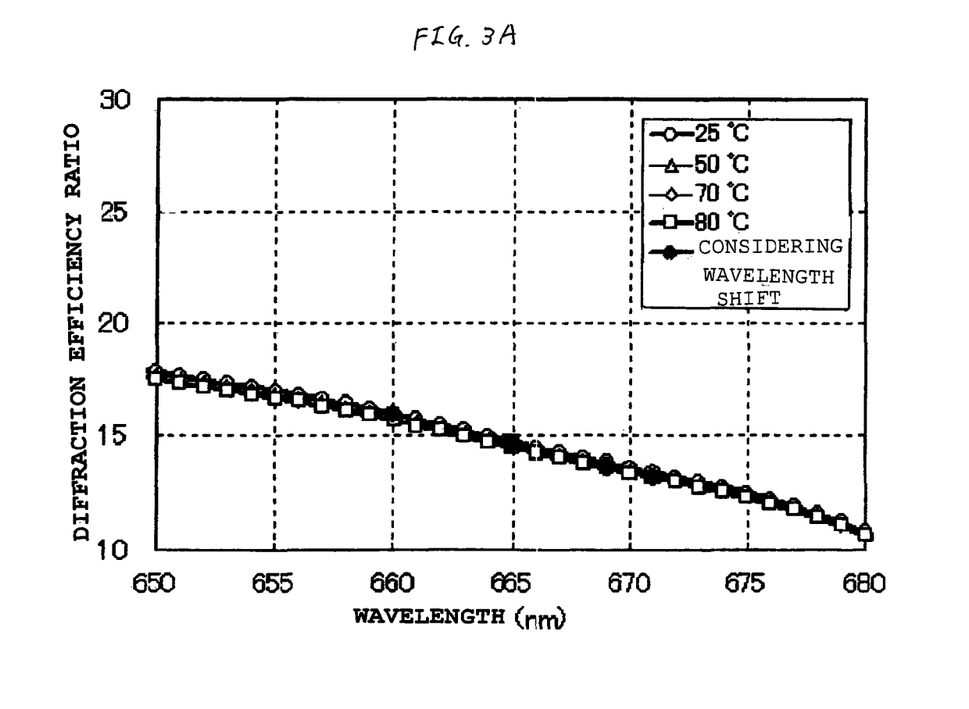
FIG. 3A is a graph showing the diffraction efficiency ratio with respect to the wavelength of light in which the thickness of the first layer is 1.70 μm in the diffractive element of FIG. 1.
Figure 3B:
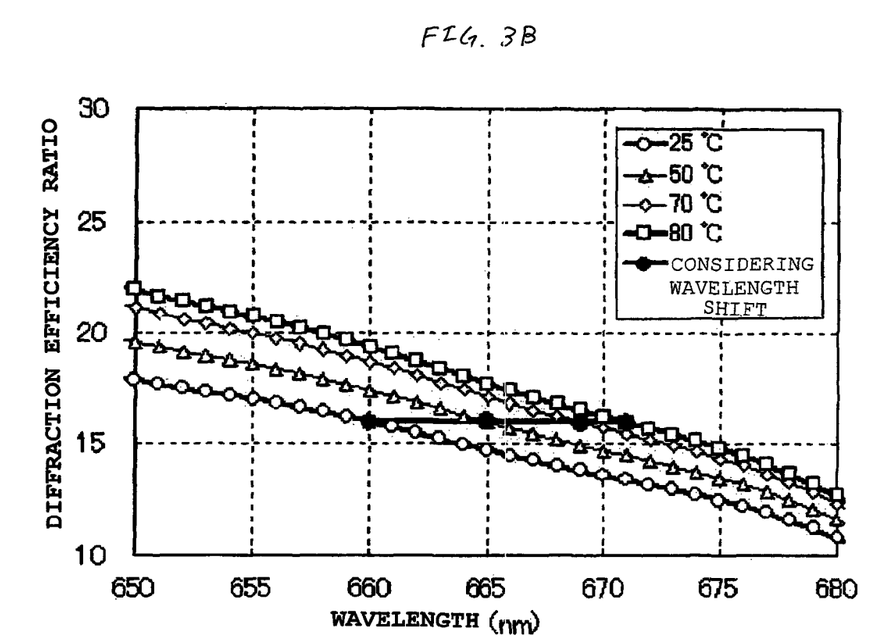
FIG. 3B is a graph showing the diffraction efficiency ratio with respect to the wavelength of light in which the thickness of the first layer is 1.26 μm in the diffractive element of FIG. 1.
Figure 3C:
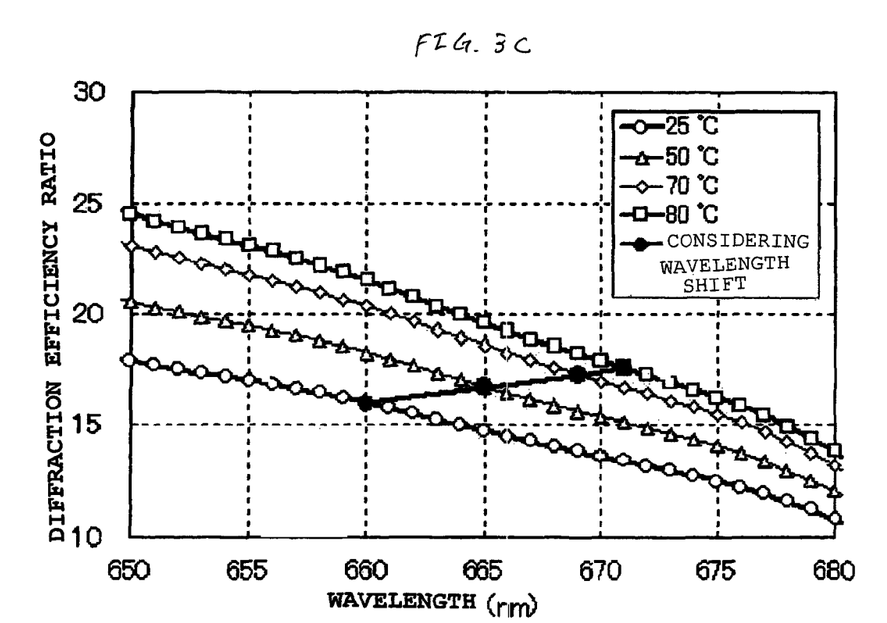
FIG. 3C is a graph showing the diffraction efficiency ratio with respect to the wavelength of light in which the thickness of the first layer is 1.05 μm in the diffractive element of FIG. 1.

More specifically, FIGS. 3A to 3C show the simulation results of change of the diffraction efficiency ratio when the thickness $d_A$ of the first layer 6 is changed. In these figures, the diffraction efficiency ratio (zero-order/first-order) with respect to the light having a wavelength of 660 nm at the temperature 25° C. is designed to be 16 in the different sizes of $d_A$. It is required that the diffraction efficiency ratio is constant against the temperature change of the system, in which it is preferable that the change width of the diffraction efficiency ratio in the temperature range from 25 to 80° C. is within ±10%, because the light quantity arriving at the optical disk is stabilized. FIG. 3A is a graph representing the change of the diffraction efficiency ratio with respect to the wavelength when $d_A$=1.70 μm in consideration of the characteristic of the temperature change factor $\alpha_A$ of the material used for the first layer 6, in which the roughly same diffraction efficiency ratio can be obtained for the light having the same wavelength, irrespective of the temperature change. In FIG. 3A, if the wavelength of light is constant at 660 nm, the diffraction efficiency ratio is also constant, but if the temperature rises to 80° C. and the wavelength of light shifts to about 671 nm on the longer wavelength side, a change of the diffraction efficiency ratio is about −18%.

FIG. 3B is a graph representing the change of the diffraction efficiency ratio with respect to the wavelength when the thickness of the first layer 6 is $d_A$=1.26 μm. In FIG. 3B, even if the temperature of the system rises to 80° C. and the wavelength of light shifts to 671 nm on the longer wavelength side, the diffraction efficiency ratio is 16, whereby a change of the diffraction efficiency ratio is fixed at 0%. FIG. 3C is a graph representing the change of the diffraction efficiency ratio with respect to the wavelength when the thickness of the first layer 6 is $d_A$=1.05 μm. In FIG. 3C, if the temperature of the system rises to 80° C. and the wavelength of light shifts to about 671 nm on the longer wavelength side, a change of the diffraction efficiency ratio is about +10%.

Figure 4:
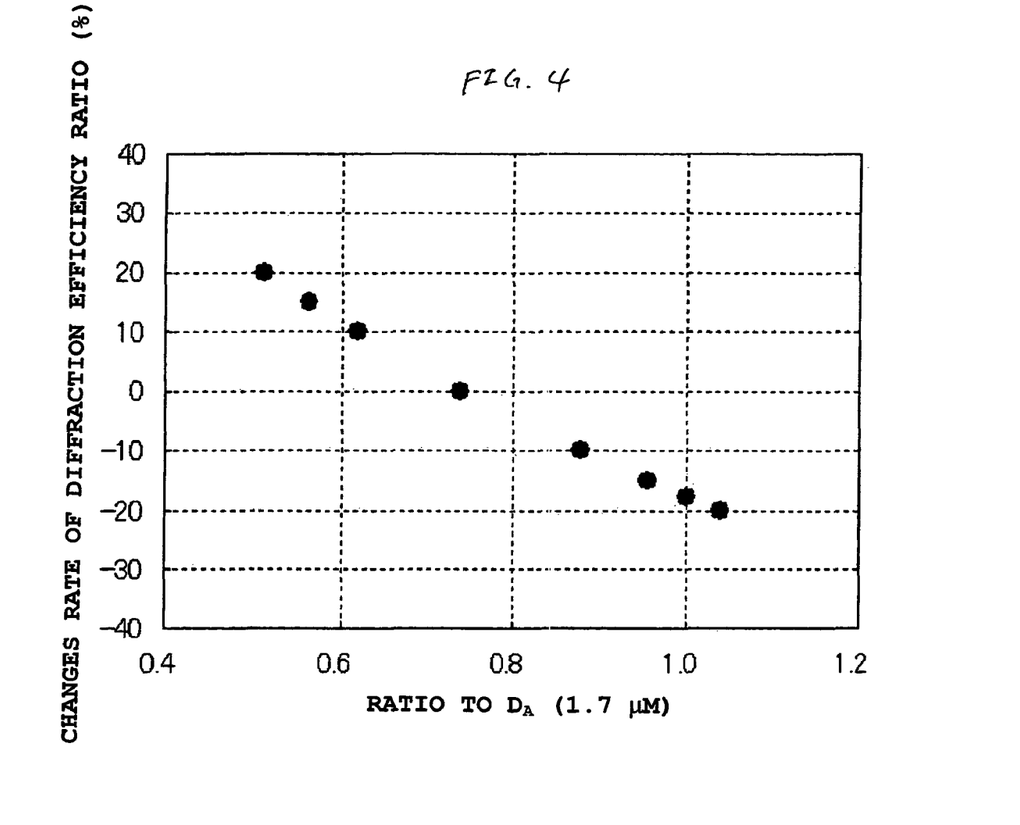
FIG. 4 is a graph showing the characteristic of the change rate of the diffraction efficiency ratio when the thickness of the first layer is changed where 1.70 μm is normalized to 1 in the diffractive element of FIG. 1.

In this way, if the thickness of the first layer 6 is set to a smaller value than $d_A$=1.70 μm at which the diffraction efficiency ratio is roughly equal at the given temperatures and the constant wavelength of light, the change of the diffraction efficiency ratio when the wavelength of light shifts to the longer wavelength side can be decreased, whereby the stable diffraction efficiency ratio against the temperature change in the system can be obtained. FIG. 4 shows a graph of the simulation results representing the change rate of the diffraction efficiency ratio when the value of $d_A$ is changed. The axis of abscissas represents the numerical value of the value of $d_A$ normalized with reference to 1.70 μm, and the axis of ordinates represents the change rate of the diffraction efficiency ratio when the wavelength is from 660 nm to 671 nm (from 25° C. to 80° C.). From FIG. 4, it can be found that to satisfy the change rate of the diffraction efficiency ratio within ≅10%, the ratio of thickness to $d_A$=1.70 μm is in the range from 0.62 to 0.88, whereby it is preferable that the ratio of thickness is from about 0.6 to about 0.9 because the stable diffraction efficiency ratio can be obtained.

In this way, since the diffraction efficiency ratio can be adjusted in consideration of the wavelength of light that shifts to the longer wavelength side with the temperature change of the system, the diffractive element 10 of this embodiment can be preferably used as the diffractive element for generating three beams in an optical head device, for example.

Figure 5:
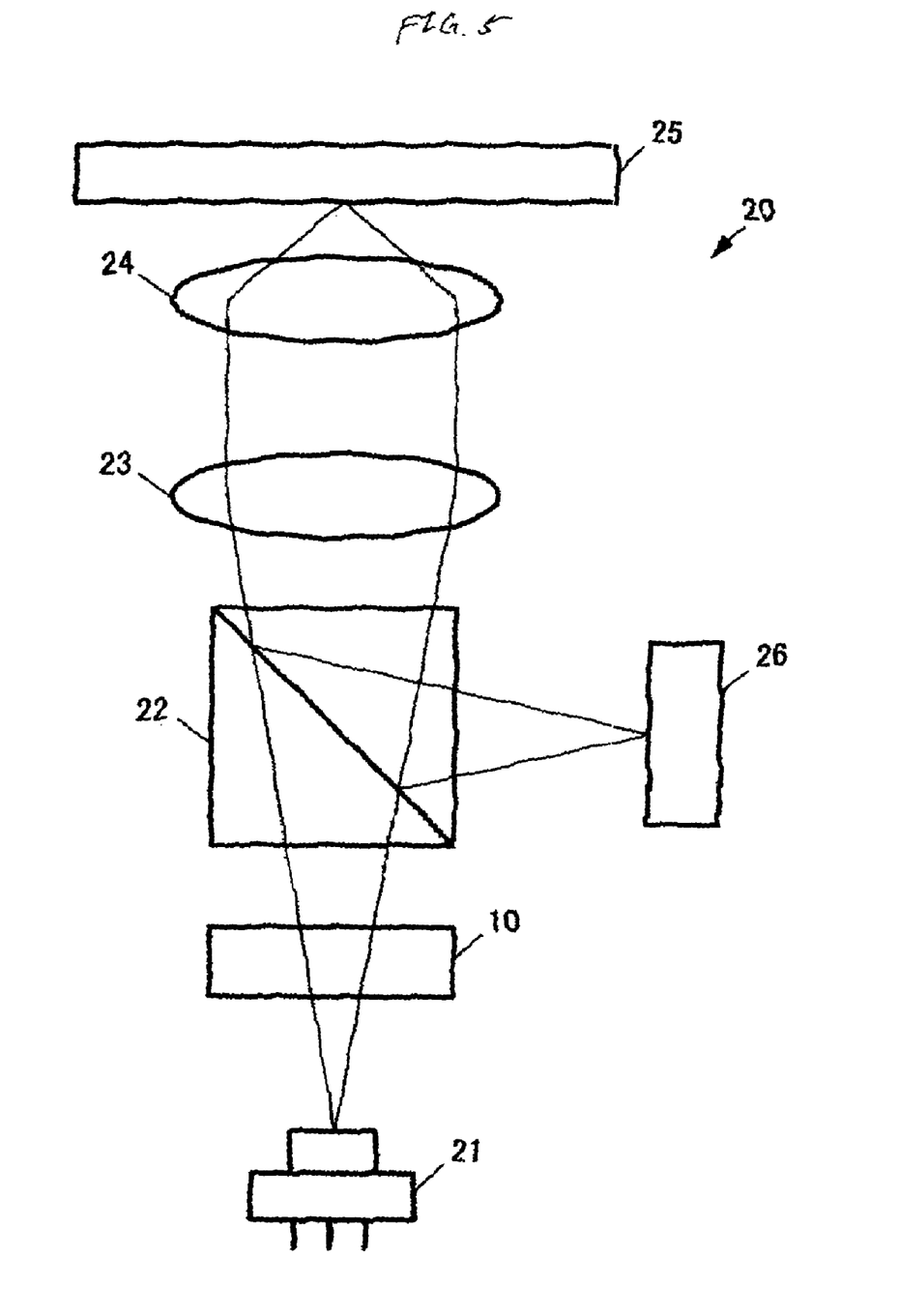
FIG. 5 is a view showing the conceptual constitution of an optical head device having the diffractive element of FIG. 1.

Referring to FIG. 5, an optical head device to which the diffractive element 10 of this embodiment is applied will be described below.

The optical head device 20 of this embodiment comprises a light source 21 for emitting the laser light beams having mutually different wavelengths, a diffractive element 10 for diffracting an incident light, a beam splitter 22 for conducting the incident light to an optical disk 25 or a photo-detector 26, a collimator lens 23 for converting the incident light to parallel light, an objective lens 24 for converging light onto the optical disk 25, and the photo-detector 26 for detecting the reproduced light from the optical disk 25, as shown in FIG. 5.

The light source 21 is composed of a dual wavelength light oscillation semiconductor laser for emitting the lights having wavelength $\lambda_1$ (660 nm) for DVD and wavelength $\lambda_2$ (785 nm) for CD, for example.

The diffractive element 10 has the temperature characteristic of FIG. 2B, as previously described, and outputs three beams including the transmitted light (zero-order diffracted light) of the laser beam having wavelength $\lambda_1$ without diffraction and the lights (± first-order diffracted lights) of diffracting the laser beam having wavelength $\lambda_1$ to the beam splitter 22. The place where the diffractive element 10 is arranged is not limited to the position as shown in FIG. 5, but may be on an optical path between the light source 21 and the objective lens 24.

The beam splitter 22 is made of a translucent material, for example, glass or plastic, and has a reflection surface for transmitting three beam lights from the diffractive element 10 and reflecting the reproduced light from the optical disk 25.

The collimator lens 23 that is made of a translucent material, for example, glass or plastic, converts the incident laser light into a parallel light.

The objective lens 24 is made of a plastic lens having a predetermined NA (Numerical Aperture), for example, and converges the incident light onto a recording layer of the optical disk 25 and captures the reflected light from the recording layer.

The photo-detector 26 includes a lens or photo diode, for example, to convert the reproduced light from the optical disk 25, which is reflected from the reflection surface of the beam splitter 22, into an electrical signal.

The optical head device 20 of this embodiment is constituted as above described and operates in the following way. That is, the lights having wavelengths $\lambda_1$ and $\lambda_2$ are emitted from the light source 21 to the diffractive element 10, and the light having wavelength $\lambda_1$ is divided into three beams including the main beam and two sub-beams by the diffractive element 10. The light having wavelength $\lambda_2$ is not diffracted by the diffractive element 10 and transmitted through it. The three beams of light pass through the beam splitter 22 and the collimator lens 23 and are converged onto the optical disk 25 of the optical recording medium by the objective lens 24. The light reflected from the optical disk 25 returns to the objective lens 24 and the collimator lens 23 in order, and is reflected from the reflection surface of the beam splitter 22, and detected by the photo-detector 26. The detected sub-beams having wavelength $\lambda_1$ are used to control the tracking.

Since the above optical head device 20 comprises the diffractive element 10 of the invention in which the temperature dependency of the diffraction efficiency for the light having wavelength $\lambda_1$ can be lower than conventionally, the stable tracking control can be made even if the temperature changes.

INDUSTRIAL APPLICABILITY

As described above, the diffractive element of the invention has the effect that the temperature dependency of the diffraction efficiency can be lower than conventionally, and is useful for the diffractive element for diffracting the light and the optical head device having this diffractive element for performing the recording or reproduction on or from the optical disk.

What is claimed is:
1. A diffractive element, comprising:
a transparent substrate;
a grating portion including a plurality of convex portions provided on at least one principal plane of said transparent substrate having a first layer containing a first transparent material and a second layer containing a second transparent material, and extended in parallel to each other in a first direction as well as periodically arranged in a second direction orthogonal to said first direction; and a filling portion for filling a third layer containing a third transparent material at least between said plurality of convex portions,
wherein the relationship $\alpha_A < \alpha_C < 0$ and $|\alpha_C| > |\alpha_B|$ is satisfied,
wherein
$\alpha_A$ is the change rate of the refractive index with the change of temperature of said first transparent material,
$\alpha_B$ is the change rate of the refractive index with the change of temperature of said second transparent material, and
$\alpha_C$ is the change rate of the refractive index with the change of temperature of said third transparent material,
wherein said first transparent material is an acrylic resin, an epoxy resin or a fluorine-containing aromatic polymer material.

2. The diffractive element according to claim 1, wherein said second layer is an optical multilayer.

3. The diffractive element according to claim 1, wherein the thickness of said first layer is selected so that the change amount of transmission phase difference with the change of temperature in said grating portion and the change amount of transmission phase difference with the change of temperature in said filling portion are equal.

4. The diffractive element according to claim 2, wherein the thickness of said first layer is selected so that the change amount of transmission phase difference with the change of temperature in said grating portion and the change amount of transmission phase difference with the change of temperature in said filling portion are equal.

5. The diffractive element according to claim 1, wherein said transparent substrate is composed of glass, quartz glass or plastic.

6. The diffractive element according to claim 1, wherein said transparent substrate has a surface that is flattened.

7. The diffractive element according to claim 1, wherein said third transparent material is an acrylic resin, an epoxy resin or a fluorine-containing aromatic polymer material.

8. The diffractive element according to claim 1, wherein the refractive indexes of said first and third transparent material substantially match.

9. The diffractive element according to claim 1, wherein said second layer comprises $SiO_2$, $SiON$, $ZrO_2$, $Ta_2O_5$, $Nb_2O_5$, $TiO_2$ or $Al_2O_3$.

10. The diffractive element according to claim 1, which satisfies the relationship $$\alpha_A \times d_A + \alpha_B \times d_B = \alpha_C \times (d_A + d_B)$$

wherein
$\alpha_A$ is the change rate of the refractive index with the change of temperature of said first transparent material,
$\alpha_B$ is the change rate of the refractive index with the change of temperature of said second transparent material,
$\alpha_C$ is the change rate of the refractive index with the change of temperature of said third transparent material,
$d_A$ is the thickness of said first layer, and
$d_B$ is the thickness of said second layer.

11. The diffractive element according to claim 1, wherein said second layer comprises an inorganic material.

12. An optical head device, comprising:
a light source for emitting the lights having mutually different two wavelengths;
an objective lens for converging light emitted from said light source onto an optical recording medium;
a photo-detector for detecting light reflected by said optical recording medium; and
a diffractive element which is arranged on an optical path between said light source and said objective lens,
wherein the diffractive element comprises:
a transparent substrate;
a grating portion including a plurality of convex portions provided on at least one principal plane of said transparent substrate having a first layer containing a first transparent material and a second layer containing a second transparent material, and extended in parallel to each other in a first direction as well as periodically arranged in a second direction orthogonal to said first direction; and
a filling portion for filling a third layer containing a third transparent material at least between said plurality of convex portions,
wherein the relationship $\alpha_A < \alpha_C < 0$ and $|\alpha_C| > |\alpha_B|$ is satisfied,
wherein
$\alpha_A$ is the change rate of the refractive index with the change of temperature of said first transparent material,
$\alpha_B$ is the change rate of the refractive index with the change of temperature of said second transparent material, and
$\alpha_C$ is the change rate of the refractive index with the change of temperature of said third transparent material,
wherein said first transparent material is an acrylic resin, an epoxy resin or a fluorine-containing aromatic polymer material.

13. An optical head device, comprising:
a light source for emitting the lights having mutually different two wavelengths;
an objective lens for converging light emitted from said light source onto an optical recording medium;
a photo-detector for detecting light reflected by said optical recording medium; and
a diffractive element which is arranged on an optical path between said light source and said objective lens,
wherein the diffractive element comprises:
a transparent substrate;
a grating portion including a plurality of convex portions provided on at least one principal plane of said transparent substrate having a first layer containing a first transparent material and a second layer containing a second transparent material, and extended in parallel to each other in a first direction as well as periodically arranged in a second direction orthogonal to said first direction; and
a filling portion for filling a third layer containing a third transparent material at least between said plurality of convex portions,
wherein the relationship $\alpha_A < \alpha_C < 0$ and $|\alpha_C| > |\alpha_B|$ is satisfied,
wherein
$\alpha_A$ is the change rate of the refractive index with the change of temperature of said first transparent material,
$\alpha_B$ is the change rate of the refractive index with the change of temperature of said second transparent material, and
$\alpha_C$ is the change rate of the refractive index with the change of temperature of said third transparent material, and
wherein said second layer is an optical multilayer, and
wherein said first transparent material is an acrylic resin, an epoxy resin or a fluorine-containing aromatic polymer material.

14. An optical head device, comprising:
a light source for emitting the lights having mutually different two wavelengths;
an objective lens for converging light emitted from said light source onto an optical recording medium;
a photo-detector for detecting light reflected by said optical recording medium; and a diffractive element which is arranged on an optical path between said light source and said objective lens, wherein the diffractive element comprises:

a transparent substrate;

a grating portion including a plurality of convex portions provided on at least one principal plane of said transparent substrate having a first layer containing a first transparent material and a second layer containing a second transparent material, and extended in parallel to each other in a first direction as well as periodically arranged in a second direction orthogonal to said first direction; and a filling portion for filling a third layer containing a third transparent material at least between said plurality of convex portions, wherein the relationship $\alpha_A < \alpha_C < 0$ and $|\alpha_C| > |\alpha_B|$ is satisfied, wherein $\alpha_A$ is the change rate of the refractive index with the change of temperature of said first transparent material, $\alpha_B$ is the change rate of the refractive index with the change of temperature of said second transparent material, and $\alpha_C$ is the change rate of the refractive index with the change of temperature of said third transparent material, and wherein the thickness of said first layer is selected so that the change amount of transmission phase difference with the change of temperature in said grating portion and the change amount of transmission phase difference with the change of temperature in said filling portion are, and wherein said first transparent material is an acrylic resin, an epoxy resin or a fluorine-containing aromatic polymer material.

15. An optical head device, comprising:

a light source for emitting the lights having mutually different two wavelengths;

an objective lens for converging light emitted from said light source onto an optical recording medium;

a photo-detector for detecting light reflected by said optical recording medium; and a diffractive element which is arranged on an optical path between said light source and said objective lens, wherein the diffractive element comprises:

a transparent substrate;

a grating portion including a plurality of convex portions provided on at least one principal plane of said transparent substrate having a first layer containing a first transparent material and a second layer containing a second transparent material, and extended in parallel to each other in a first direction as well as periodically arranged in a second direction orthogonal to said first direction; and a filling portion for filling a third layer containing a third transparent material at least between said plurality of convex portions, wherein the relationship $\alpha_A < \alpha_C < 0$ and $|\alpha_C| > |\alpha_B|$ is satisfied, wherein $\alpha_A$ is the change rate of the refractive index with the change of temperature of said first transparent material, $\alpha_B$ is the change rate of the refractive index with the change of temperature of said second transparent material, and $\alpha_C$ is the change rate of the refractive index with the change of temperature of said third transparent material, and wherein said second layer is an optical multilayer, and wherein the thickness of said first layer is selected so that the change amount of transmission phase difference with the change of temperature in said grating portion and the change amount of transmission phase difference with the change of temperature in said filling portion are, and wherein said first transparent material is an acrylic resin, an epoxy resin or a fluorine-containing aromatic polymer material.

* * * * *